US008434186B2

(12) United States Patent
Wildauer et al.

(10) Patent No.: US 8,434,186 B2
(45) Date of Patent: May 7, 2013

(54) DRUM AUGER

(75) Inventors: John B. Wildauer, Cherry Hill, NJ (US); Michael James Daciw, Aston, PA (US); Ross Carl, River Forest, IL (US); Charles A. Patterson, Durango, CO (US); Victor Hoernig, Lowell, IN (US)

(73) Assignee: Cobra Products, Inc., Bridgeport, NJ (US)

(*) Notice: Subject to any disclaimer, the term of this patent is extended or adjusted under 35 U.S.C. 154(b) by 459 days.

(21) Appl. No.: 12/703,329

(22) Filed: Feb. 10, 2010
(Under 37 CFR 1.47)

(65) Prior Publication Data

US 2011/0191969 A1 Aug. 11, 2011

(51) Int. Cl.

| | |
|---|---|
| ***B08B 1/00*** | (2006.01) |
| ***B08B 7/00*** | (2006.01) |
| ***B08B 9/00*** | (2006.01) |
| ***B08B 9/02*** | (2006.01) |
| ***F16L 45/00*** | (2006.01) |
| ***F16L 55/00*** | (2006.01) |

(52) U.S. Cl.
USPC .......... 15/104.33

(58) Field of Classification Search .......... 15/104.33, 15/104.31, 104.05, 104.03, DIG. 10; 138/37; 248/49, 74.1, 74.2, 222.41, 223.21; 4/225.01, 4/225.1; D32/14; D8/68
See application file for complete search history.

(56) References Cited

U.S. PATENT DOCUMENTS

| | | | | |
|---|---|---|---|---|
| 1,661,759 | A * | 3/1928 | King | 15/104.33 |
| 1,852,454 | A * | 4/1932 | Foster | 16/108 |
| 1,982,402 | A * | 11/1934 | Shade | 15/104.33 |
| 2,158,577 | A * | 5/1939 | Haley | 15/104.095 |
| 2,284,939 | A | 6/1942 | Asnard | |
| 2,786,218 | A * | 3/1957 | Yousem | 15/104.33 |
| 3,691,583 | A * | 9/1972 | Silverman et al. | 15/104.33 |
| 4,218,802 | A * | 8/1980 | Babb et al. | 15/104.33 |
| 4,364,140 | A * | 12/1982 | Irwin | 15/104.33 |
| 4,376,321 | A * | 3/1983 | Dudley | 15/104.33 |
| 4,644,603 | A * | 2/1987 | Meyer | 15/104.33 |
| 4,914,775 | A * | 4/1990 | Kirk | 15/104.33 |
| 4,956,889 | A * | 9/1990 | Kirk | 15/104.33 |
| 5,029,356 | A * | 7/1991 | Silverman et al. | 15/104.33 |
| 5,107,550 | A * | 4/1992 | Hawro | 4/255.08 |
| 5,173,984 | A * | 12/1992 | Kaye | 15/104.33 |
| 5,265,301 | A * | 11/1993 | Irwin | 15/104.33 |
| 5,702,076 | A * | 12/1997 | Humber | 248/57 |
| 6,158,076 | A | 12/2000 | Rutkowski et al. | |
| 6,470,525 | B1 * | 10/2002 | Silverman | 15/104.33 |
| 6,615,436 | B1 * | 9/2003 | Burch et al. | 15/104.33 |
| D650,954 | S * | 12/2011 | Patterson et al. | D32/14 |
| 2008/0276392 | A1 * | 11/2008 | Schultz et al. | 15/104.33 |
| 2009/0083915 | A1 * | 4/2009 | Cicchelli et al. | 15/3 |
| 2009/0293214 | A1 * | 12/2009 | Ackerman et al. | 15/104.05 |
| 2010/0132101 | A1 * | 6/2010 | Bates et al. | 4/255.04 |
| 2010/0294316 | A1 * | 11/2010 | Antal et al. | 134/22.12 |

* cited by examiner

*Primary Examiner* — Vanitha Elgart
(74) *Attorney, Agent, or Firm* — Carlson, Gaskey & Olds

(57) ABSTRACT

An apparatus for cleaning drains has a cable having a length and a first width and an extension disposed upon the first width of the cable to create a second width of the cable. A guide allows the length of the cable to pass therethrough but the second width whereby the cable will stop passing through the guide in a given direction if the second width contacts the guide.

12 Claims, 2 Drawing Sheets

DRUM AUGER

FIELD OF THE INVENTION

This invention relates to the art of drain cleaning tools and, more particularly, to cable feeding devices for hand held and hand operated drain-cleaning tools.

BACKGROUND OF THE INVENTION

Some hand held and hand operated drain cleaning tools have a cable or snake coiled in a drum. A crank is attached to the drum to allow a user to rotate the drum about a support assembly from which a handle depends. The cable extends forwardly of the drum and is extended relative thereto for insertion into a drain to be cleaned and rotates with the drum so as to clear a blockage encountered in the drain. A user withdraws a length of the cable from the drum until a snag in a drain is reached and then a thumbscrew at the forward end of the drum is tightened against the cable so as to preclude unintended displacement of the cable into the drum as the cable is advanced. The drum is then held with one hand and rotated by the other while the user forces the cable into the drain at the same time. When the withdrawn length of the cable has been inserted into the drain, the thumb screw is loosened, the cable is held in place and the drum is withdrawn from the entrance to the drain to withdraw a further length of cable from the drum. The thumbscrew is again tightened and the operation is repeated to displace the newly extended length of the cable to the drain. When the drain cleaning operation is completed, the thumbscrew is loosened and the cable is manually pushed back into the drum by the user.

In some known hand augers, the hand support for holding the drum for rotation is a tubular support at the rear end of the drum and, in other support arrangements, such a tubular support is disposed forwardly of the drum and may include a pistol grip type handle extending laterally of the axis of rotation for supporting the drum.

Hand held and hand operated drain cleaning tools are desirable in that they are relatively lightweight, structurally simple, economical to manufacture, and, for all of these reasons, ideal for use in connection with light duty drain cleaning operations such as those encountered in a residence.

SUMMARY

According to an embodiment, an apparatus for cleaning drains has a cable having a length and a first width and an extension disposed upon the first width of the cable to create a second width of the cable. A guide allows the length of the cable to pass therethrough but not the second width whereby the cable will stop passing through the guide in a given direction if the second width contacts the guide.

According to another embodiment, a drain cleaner has a drum for holding a cable, the drum having a center of gravity, a frame for rotatably holding the drum, and a handle disposed below the center of gravity of the drum such that a user may hold the drum without strain upon a users wrist. The cable has a length and a first width and an extension disposed upon the first width of the cable to create a second width of the cable. A guide allows the length of the cable to pass therethrough but not the second width whereby the cable will stop passing through the guide in a given direction if the second width contacts the guide.

According to a still further embodiment, a drain cleaner has a drum holding a cable and having a center of gravity, a frame for rotatably holding the drum, a handle disposed below the center of gravity such that a user may hold the drum without strain upon a users wrist, the cable having a length and a first width.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
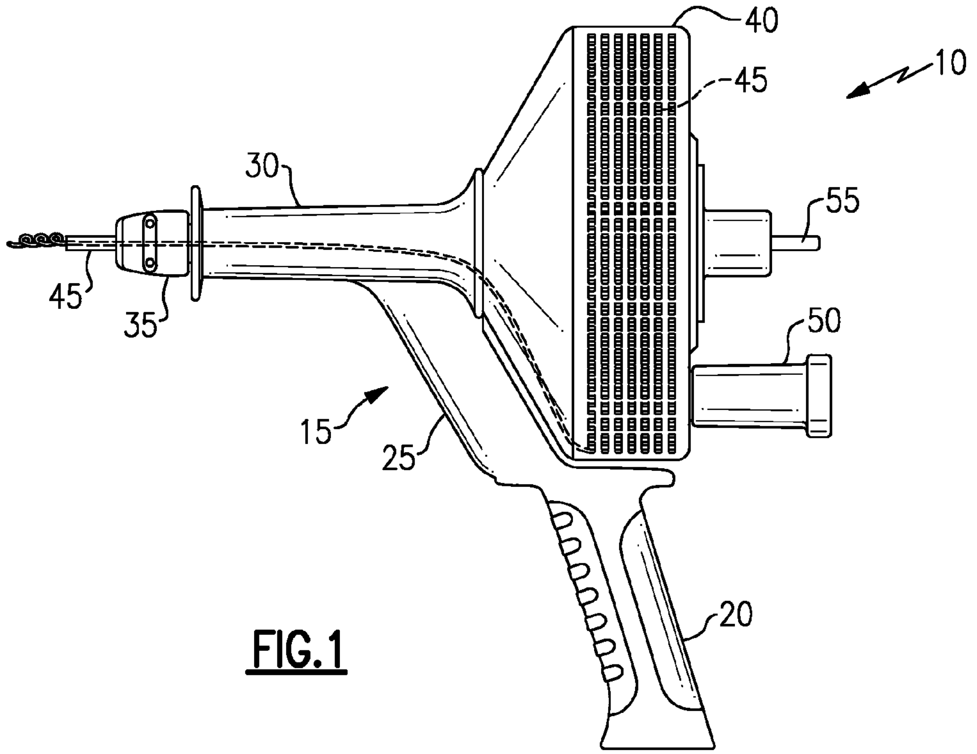
FIG. 1 is a perspective view of the auger.

Referring now to FIG. 1, a non-limiting embodiment of an auger 10 used to clean drains has a support structure 15 that has a handle 20, a flange 25 extending from the handle 20, a support arm 30 and a nozzle 35. The auger has a drum 40 that holds a coiled snake 45 and a handle 50. The drum is supported in the support structure 15 by a shaft 55 that extends into the support arm 30 as is known in the art.

The drum with a fully wound snake therein forms a coil and has a center of gravity, shown as COG, that is held directly over the handle 20 to make it easier for that user to support the auger 10 without torquing that users wrist.

Figure 2:
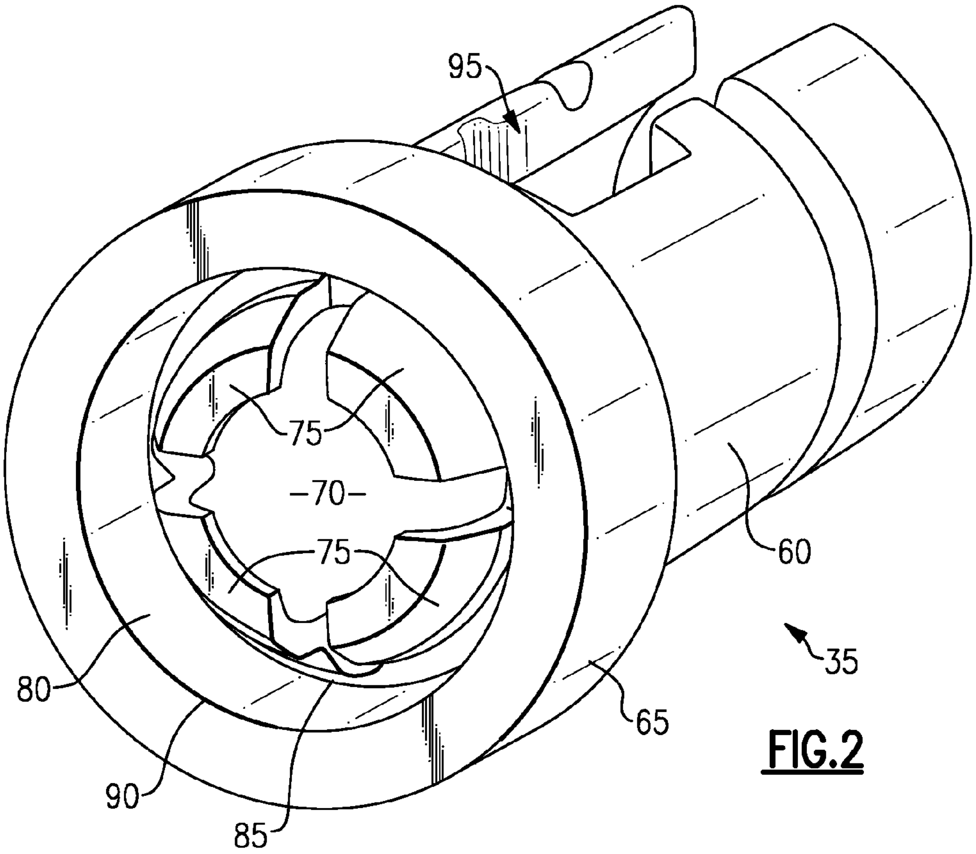
FIG. 2 is a perspective view of the nozzle of the auger of FIG. 1.
Figure 3:
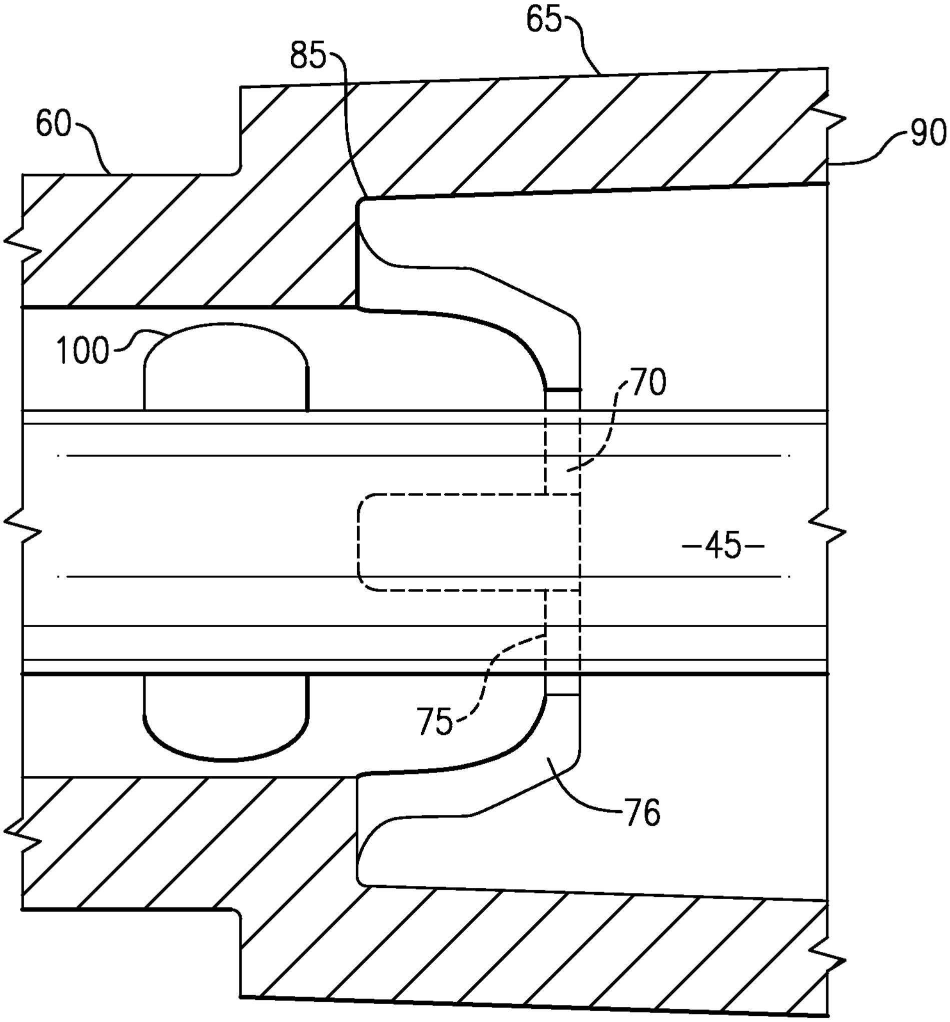
FIG. 3 is a sectional view of the auger nozzle of FIG. 2.

Referring now to FIGS. 2 and 3, the nozzle 35 is shown. The nozzle has a body 60 shaped like a cylinder, a forwardly extending flange 65 and opening 70 defined by four fingers 75, each finger having curved tip 76 defining the opening 70, and having a lesser diameter than the body 60. The flange 65 has a circular interior 80 that has a lesser diameter at the back 85 than the diameter at the front 90 of the flange. The difference in diameters allows water (not shown) that may be scraped off the snake 45 as the snake is withdrawn from a drain (not shown) into the auger. The body 60 has an opening 95 that may hold a like a screw, not shown, to stop the snake 45 from rotating relative to the handle 50 when an object like a toilet or a sink (not shown) is being snaked.

Referring now to FIG. 3, a cross-section of the nozzle 35 is shown. The snake 45, which has a width and a diameter, has an area 100 of increased diameter. The area of increased diameter is designed to be impeded from extending through the curved tips 76 of the finger 75 by their area as the diameter is less than the openings 70 formed by the fingers 75. The area 100 may be a metallic lug that is press fitted over the snake 45 or other type of extension, like a wrapped or barbed wire that will not fit through the opening 70. Similarly the snakes 45, which are frequently coiled or flat wire, may have a portion thereof that is manufactured with an increased diameter so that the snake will not pull through the fingers 75.

In operation, a user will pull the snake 45 from the auger into an area in which the drain, not shown, may need to be to have a clog removed. The snake is pulled out until it reaches a clog. Then, as is known, the snake is fixed within the auger so that when the handle 50 is turned the snake will also be turned. Occasionally, the snake is pulled so far to reach a snag that it might leave the auger to be lost down a drain. However, in this embodiment, when a length of the snake is pulled so that it might come out of the auger, the 100 will interfere with the fingers due to its increased diameter it does not fit through hole 70. It may save a user from the inconvenience of losing the snake or having to refit it within the auger for reuse.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. For instance, the principles of this invention may also apply to a chair for which multiple heights are desired. The scope of legal protection given to this disclosure can only be determined by studying the following claims.

What is claimed:

1. A drain cleaner comprising:

a drum for holding a cable and having a center of gravity, a frame for rotatably holding said drum, a handle disposed directly below said center of gravity of said drum such that a user may hold said drum without strain upon a users wrist, said cable having a length and a first width, an extension disposed upon said first width of said cable to create a second width of the cable, a guide through which said length of said cable may pass therethrough but not said second width whereby said cable will stop passing through said guide in a given direction if said extension contacts said guide.

2. The apparatus of claim 1 wherein said guide at least partially surrounds said cable and has a diameter greater than said first width.

3. The apparatus of claim 1 wherein said second width is greater than said first width.

4. The apparatus of claim 1 wherein said guide is comprised of a plurality of fingers said fingers defining at least a partial surround having an internal dimension that allows said first width of said cable to pass therethrough but not said second width.

5. The apparatus of claim 4 wherein said fingers have a curved portion to form said guide and prevent said second width from passing therethrough.

6. A drain cleaner comprising:

a drum holding a cable and having a center of gravity, a frame for rotatably holding said drum, a handle disposed directly below said center of gravity such that a user may hold said drum without strain upon a users wrist, said cable having a length and a first width.

7. The drain cleaner of claim 6 wherein said cable further comprises:

an extension disposed upon said first width of said cable to create a second width of the cable, a guide disposed within said frame through which said length of said cable may pass therethrough but not said second width whereby said cable will stop passing through said guide as said cable exits said drum if said second width contacts said guide.

8. The apparatus of claim 7 wherein said guide at least partially surrounds said cable and has a diameter greater than said first width.

9. The apparatus of claim 7 wherein said second width is greater than said first width.

10. The apparatus of claim 7 wherein said guide is comprised of a plurality of fingers said fingers defining at least a partial surround having an internal dimension that allows said first width of said cable to pass therethrough but not said second width.

11. The apparatus of claim 10 wherein said fingers have a curved portion to form said guide and prevent said second width from passing therethrough.

12. The apparatus of claim 7 wherein said second width is defined by a lug.

* * * * *